(12) United States Patent
Sagen et al.

(10) Patent No.: US 11,556,154 B2
(45) Date of Patent: *Jan. 17, 2023

(54) PROTECTIVE CASE FOR FOLDING ELECTRONIC DEVICE

(71) Applicant: Otter Products, LLC, Fort Collins, CO (US)

(72) Inventors: Jason Sagen, Fort Collins, CO (US); Bryan W. Goings, Fort Collins, CO (US); Minna L. Ranjeva, San Diego, CA (US); Lee B. Gates, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,133

(22) Filed: Jun. 8, 2022

(65) Prior Publication Data

US 2022/0300044 A1     Sep. 22, 2022

Related U.S. Application Data

(63) Continuation of application No. 17/320,320, filed on May 14, 2021, now Pat. No. 11,402,877.

(Continued)

(51) Int. Cl.
  *G06F 1/16* (2006.01)
(52) U.S. Cl.
  CPC .......... *G06F 1/1681* (2013.01); *G06F 1/1618* (2013.01); *G06F 1/1641* (2013.01); *G06F 1/1656* (2013.01)

(58) Field of Classification Search
  CPC .... G06F 1/1681; G06F 1/1618; G06F 1/1641; G06F 1/1656; G06F 2200/1633;
  (Continued)

(56) References Cited

U.S. PATENT DOCUMENTS

| | | |
|---|---|---|
| 4,984,706 A | 1/1991 | Cadwell et al. |
| 5,632,373 A | 5/1997 | Kumar et al. |

(Continued)

FOREIGN PATENT DOCUMENTS

| | | |
|---|---|---|
| GB | 2521152 A | 6/2015 |
| WO | 1994000037 A1 | 1/1994 |

(Continued)

OTHER PUBLICATIONS

U.S. Appl. No. 16/657,557, filed Oct. 18, 2019, Ryan J. Cavenagh.

*Primary Examiner* — Rockshana D Chowdhury

(57) ABSTRACT

A protective case for a foldable electronic device having a first member configured for slidably receiving a first portion of the foldable electronic device. The first member has a first ball extending from the first member. The protective case also has a second member configured for slidably receiving a second portion of the foldable electronic device. The second member has a second ball extending from the second member. The protective case also includes sockets for receiving the ball members, wherein each of the balls rotates within a respective one of the sockets in multiple axes such that the hinge member pivots inward when the protective case is transitioned from the opened position to the closed position to prevent the foldable electronic device from sliding out of the protective case.

18 Claims, 13 Drawing Sheets

Related U.S. Application Data

(60) Provisional application No. 63/026,832, filed on May 19, 2020.

(58) Field of Classification Search
CPC ............... G06F 1/1616; G06F 1/1626; A45C 2011/002; A45C 2011/003; A45C 11/00; H04M 1/0216; H04M 1/185
See application file for complete search history.

(56) References Cited

U.S. PATENT DOCUMENTS

| | | |
|---|---|---|
| 5,966,647 A | 10/1999 | Sawai |
| 6,109,434 A | 8/2000 | Howard, Jr. |
| 6,267,236 B1 | 7/2001 | Seok |
| 7,343,184 B2 | 3/2008 | Rostami |
| 7,355,338 B2 | 4/2008 | Osame et al. |
| 7,444,176 B2 | 10/2008 | Oda et al. |
| 7,609,512 B2 | 10/2009 | Richardson et al. |
| 7,850,032 B2 | 12/2010 | Carnevali et al. |
| 7,886,903 B1 | 2/2011 | Wurzelbacher, Jr. et al. |
| 7,933,122 B2 | 4/2011 | Richardson et al. |
| 8,261,933 B2 | 9/2012 | Kidd et al. |
| 8,310,826 B2 | 11/2012 | Wu et al. |
| 8,498,103 B2 | 7/2013 | Graneto, III |
| 8,965,458 B2 | 2/2015 | Richardson et al. |
| 9,025,317 B2 | 5/2015 | Richardson et al. |
| 9,232,674 B2 | 1/2016 | Wang et al. |
| 9,735,595 B2 | 8/2017 | Colahan et al. |
| 10,064,298 B2 | 8/2018 | Cavenagh et al. |
| 10,216,222 B2 * | 2/2019 | Fenton .................. A45F 5/00 |
| 10,231,043 B2 * | 3/2019 | Hemesath ........... A45C 13/1069 |
| 10,241,548 B2 * | 3/2019 | Tazbaz .................. G06F 1/1641 |
| 10,314,185 B2 | 6/2019 | Cavenagh et al. |
| 10,317,934 B2 * | 6/2019 | Hampton ............... G06F 1/1601 |
| 10,344,510 B2 * | 7/2019 | Siddiqui ............... G06F 1/1618 |
| 10,585,458 B2 * | 3/2020 | Park ....................... G06F 1/1656 |
| 10,845,844 B1 * | 11/2020 | Chan ..................... G06F 1/1628 |
| 10,849,241 B2 | 11/2020 | Cavenagh et al. |
| 10,884,453 B2 * | 1/2021 | Armstrong .............. G06F 1/203 |
| 10,928,854 B1 * | 2/2021 | Fenton .................. H04B 1/3888 |
| 2002/0065054 A1 | 5/2002 | Humphreys et al. |
| 2003/0095374 A1 | 5/2003 | Richardson |
| 2003/0114184 A1 | 6/2003 | Wilson |
| 2004/0180706 A1 | 9/2004 | Pan |
| 2004/0256535 A1 | 12/2004 | Desch |
| 2004/0262179 A1 | 12/2004 | Gartrell et al. |
| 2005/0045505 A1 | 3/2005 | Vandevenne et al. |
| 2005/0139498 A1 | 6/2005 | Goros |
| 2006/0160586 A1 | 7/2006 | Cheng |
| 2006/0175370 A1 | 8/2006 | Arney et al. |
| 2006/0177048 A1 | 8/2006 | Tsutaichi et al. |
| 2006/0198513 A1 | 9/2006 | Eldon |
| 2006/0226040 A1 | 10/2006 | Medina |
| 2007/0201689 A1 | 8/2007 | Uramoto et al. |
| 2007/0205122 A1 | 9/2007 | Oda et al. |
| 2008/0032758 A1 | 2/2008 | Rostami |
| 2008/0053851 A1 | 3/2008 | Ko et al. |
| 2008/0083631 A1 | 4/2008 | Tsang et al. |
| 2008/0121321 A1 | 5/2008 | Tiner et al. |
| 2008/0125197 A1 | 5/2008 | Hongo et al. |
| 2008/0302687 A1 | 12/2008 | Sirichai et al. |
| 2009/0009945 A1 | 1/2009 | Johnson et al. |
| 2009/0032421 A1 | 2/2009 | Sween et al. |
| 2009/0034169 A1 | 2/2009 | Richardson et al. |
| 2009/0050499 A1 | 2/2009 | Calco et al. |
| 2009/0194445 A1 | 8/2009 | Mongan et al. |
| 2009/0211775 A1 | 8/2009 | Yamaguchi et al. |
| 2009/0233658 A1 | 9/2009 | Murayama et al. |
| 2009/0236246 A1 | 9/2009 | Ai |
| 2009/0314400 A1 | 12/2009 | Liu |
| 2010/0096284 A1 | 4/2010 | Bau |
| 2010/0110629 A1 | 5/2010 | Dietz et al. |
| 2010/0122924 A1 | 5/2010 | Andrews |
| 2010/0238119 A1 | 9/2010 | Dubrovsky et al. |
| 2011/0157800 A1 | 6/2011 | Richardson et al. |
| 2011/0228459 A1 | 9/2011 | Richardson et al. |
| 2011/0267757 A1 | 11/2011 | Probst et al. |
| 2012/0043234 A1 | 2/2012 | Westrup |
| 2012/0088557 A1 | 4/2012 | Liang |
| 2012/0154288 A1 | 6/2012 | Walker |
| 2012/0199501 A1 | 8/2012 | Gette et al. |
| 2012/0261304 A1 | 10/2012 | Busri |
| 2014/0043737 A1 | 2/2014 | Chen et al. |
| 2014/0262848 A1 | 9/2014 | Fathollahi et al. |
| 2014/0262875 A1 | 9/2014 | Carnevali |
| 2014/0263939 A1 | 9/2014 | Rinner |
| 2015/0031223 A1 | 1/2015 | Liao |
| 2015/0156297 A1 | 6/2015 | Crawford et al. |
| 2015/0257285 A1 | 9/2015 | Wilson et al. |
| 2015/0296942 A1 | 10/2015 | Sirichai |
| 2016/0139635 A1 | 5/2016 | Gibson et al. |
| 2016/0162112 A1 | 6/2016 | Lee et al. |
| 2016/0234951 A1 | 8/2016 | Chen et al. |
| 2016/0299532 A1 | 10/2016 | Gheorghiu et al. |
| 2016/0381014 A1 | 12/2016 | Kim |
| 2017/0054466 A1 * | 2/2017 | Flores .................. H04B 1/3888 |
| 2017/0250719 A1 | 8/2017 | Stryker et al. |
| 2017/0257961 A1 | 9/2017 | Chen et al. |
| 2018/0139857 A1 * | 5/2018 | Cavenagh ............ H05K 5/0086 |
| 2018/0348817 A1 | 12/2018 | Armstrong |
| 2019/0228208 A1 | 7/2019 | Cho et al. |
| 2020/0412401 A1 | 12/2020 | Kim et al. |
| 2021/0244144 A1 | 8/2021 | Cavenagh et al. |
| 2021/0303033 A1 * | 9/2021 | Hong .................... G06F 1/1656 |

FOREIGN PATENT DOCUMENTS

| | | |
|---|---|---|
| WO | 1999041958 A1 | 8/1999 |
| WO | 2011067921 A1 | 6/2011 |

* cited by examiner

PROTECTIVE CASE FOR FOLDING ELECTRONIC DEVICE

CROSS REFERENCE TO RELATED APPLICATIONS

This application is a continuation of U.S. patent application Ser. No. 17/320,320, filed May 14, 2021, which claims priority to U.S. Provisional Patent Application No. 63/026,832, filed May 19, 2020, all of which are hereby incorporated by reference in their entireties.

FIELD

This disclosure relates generally to a case or enclosure for protecting an electronic device.

BACKGROUND

Mobile telephones, portable computers, and tablet computers are convenient tools that allow people to work, communicate with one another, conduct business, and play games while on the go and away from hardwired Internet connections. These types of electronic devices allow people to communicate via voice, text message, short message service (SMS), instant messaging (IM), and the like. Other such portable devices include computers, personal digital assistants, smartphones, electronic digital readers, electronic game devices, video recorders, cameras, and the like. These types of portable electronic devices are often expensive and contain fragile components that make them susceptible to damage due to dropping, shock, or impact. Protective cases are often used to protect these types of devices. Some newer variations of these devices are foldable and may contain displays on more than one surface. Improved protective cases for foldable electronic devices are desired.

SUMMARY

In one exemplary embodiment, a protective case is provided for a foldable electronic device having a first portion that is hingeably attached to a second portion. The foldable electronic device is configured to articulate between one or more closed positions and an opened position. The protective case includes a first member, a second member, and at least one hinge member. The first member is configured for slidably receiving the first portion of the foldable electronic device. The first member has a first ball extending from the first member. The second member is configured for slidably receiving the second portion of the foldable electronic device. The second member has a second ball extending from the second member. The hinge member has a first socket and a second socket in which the first ball and the second ball, respectively, are captured and rotate thereby permitting the first member to articulate relative to the second member such that the foldable electronic device electronic remains articulable between the closed positions and the opened position when the protective case is installed on the foldable electronic device. The hinge member is configured to pivot inward when the protective case is transitioned from the opened position to one of the closed positions to prevent the foldable electronic device from sliding out of the protective case.

In one embodiment, the hinge member includes a first slot which provides access to the first socket and a second slot which provides access to the second socket, wherein the first slot and the second slot are on opposite sides of the hinge member.

In another embodiment, the first ball is attached to the first member with a first shaft and the second ball is attached to the second member with a second shaft.

In another embodiment, the balls permit the respective shafts to rotate within the respective slots of the hinge member thereby permitting the first member to articulate relative to the second member.

In yet another embodiment, both shafts and the hinge member rotate within the respective slots within a first plane when transitioning between the opened position and the closed position.

In yet another embodiment, each of the slots includes a recess or detent configured to receive the respective shaft when the protective case is in the closed position, wherein the hinge member pivots inward when the shafts are in the slot recesses, wherein the hinge member pivots inward in a plane that is different from the first plane.

In another embodiment, the hinge member includes a top portion and a bottom portion, wherein the top portion has a width that is greater than a width of the bottom portion.

In another embodiment, at least one of the first member and the second member contact the top portion of the hinge member, or the wider portion of the hinge member, when the protective case is transitioned to the closed position causing the hinge member to pivot inward due to the width of the top portion of the hinge member being greater than the width of the bottom portion and due to the shafts transitioning into the slot recesses.

In one variation, the first portion and the second portion of the foldable electronic device slide into the first member and the second member of the case, respectively, when the foldable electronic device and the protective case are substantially in the closed position to install the foldable electronic device in the protective case.

In another variation, the protective case includes a second hinge member, wherein the first member includes a third ball and a third shaft and the second member includes a fourth ball and a fourth shaft.

In some examples, the third ball, the third shaft, the fourth ball, and the fourth shaft interface with or engage the second hinge member.

In another variation, the protective case includes a first substantially transparent membrane which interfaces with the first member and is configured to extend over a display area of the first portion of the foldable electronic device.

In a further variation, the protective includes a second substantially transparent membrane which interfaces with the second member and is configured to extend over a display area of the second portion of the foldable electronic device.

Other variations and embodiments are possible, including variations and embodiments which do not necessarily include all of the elements described above or below and/or variations and embodiments which may include additional elements.

DETAILED DESCRIPTION

The subject matter described herein relates generally to a housing, case, protective case, enclosure, or protective enclosure, for encasing, or at least partially encasing, an electronic device. It is to be understood that although the singular "device" is used herein, the term encompasses one or more devices. The device or devices may be any electronic device that is capable of being fit within the protective enclosure and/or in need of protecting from one or more adverse environmental conditions, mishandling and/or damage, such as damage from dropping, shock, impact, and/or contacting dust or liquid. The protective enclosure or case may be of any appropriate size and dimension so long as it is capable of enclosing the device and protecting it, for instance, from rough treatment and/or adverse conditions. The protective enclosure may be provided as a single piece, or as two or more distinct pieces not directly attached to each other.

The protective enclosure may be a case configured for encasing a device, such as an electronic device, that may be, for example, a mobile telephone device, a mobile computing device, a tablet computer, and/or a smart phone. The electronic device may have one or more screens, such as a touch screen. In some instances, the protective enclosure may fit over at least a portion of an existing housing of the electronic device. In other instances, the protective enclosure is part of a device, such as an electronic device, which encloses or encases various components of the electronic device. For example, the protective enclosure may be the protective enclosure of a mobile device, tablet computer, or other electronic device and may fit over an existing housing of the electronic device.

It is to be understood that although a particular embodiment is presented herein, such as a protective enclosure for encasing the electronic device, such as a smart phone, therein, the device to be housed may be any of a number of different objects or components thereof, as described above, and the protective enclosure may, therefore, have a number of different shapes, sizes, and configurations without departing from the nature of the disclosure. For instance, as depicted herein, the protective enclosure may include two separate members, e.g., separate individual top and bottom members, that are configured for being removably coupled together so as to surround an electronic device and thereby encase the electronic device. In certain instances (not shown), the top and bottom members may not be separate members, but rather may be members that are joined, for instance, by a common hinge element, or a single member configured for being folded upon itself and thereby forming the protective enclosure. Hence, the scope of the protective enclosures and systems described herein with respect to the particular embodiments set forth in reference to the figures is not intended to be unduly limiting.

Figure 1A:
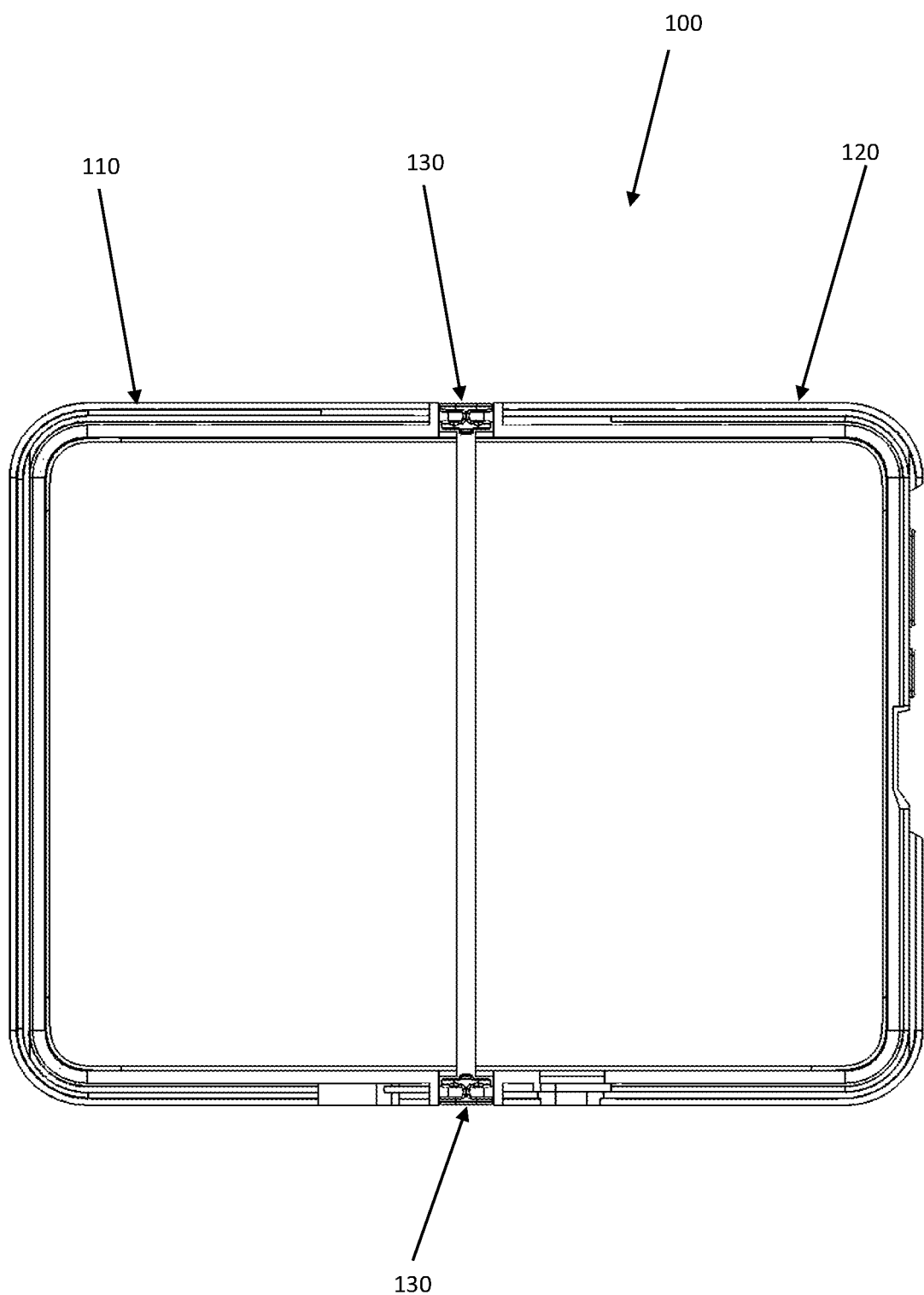
FIG. 1A illustrates a front view of a protective case in an opened position.

FIG. 1A illustrates a protective case 100 for a foldable electronic device having a first portion that is hingeably attached to a second portion. The electronic device may have a closed position in which the first portion is folded over the second portion like a closed book. The electronic device may also have an opened position in which the first portion is rotated away from the second portion such that the first and second portions are substantially in a same plane similar to an open book resting on a table. In some examples, the electronic device may also be folded in the opposite direction such that it reaches a second closed position where the back surfaces of the first portion and the second portion are facing each other. The electronic device may have displays on any or all of the surfaces. Any of the displays may be a display screen, an interactive touchscreen, a touchscreen, or a touch-sensitive display. Any of the displays may include foldable display elements. Any of the displays may span the first and second portions of the device. The first portion and the second portion may have separate display portions that meet or abut when the device is in the open position.

As illustrated in FIG. 1A, protective case 100 may have a first member 110 and second member 120. In FIG. 1A, protective case 100 is in the opened position. First member 110 and second member 120 are hingeably or rotatably attached to each other with two hinge members 130. In other examples, more or fewer hinge members 130 may be used. Each of first member 110 and second member 120 may include multiple components and may include a cushioning liner. First member 110 is configured to slidably receive the first portion of the electronic device while second member 120 is configured to slidably receive the second portion of the electronic device while still allowing the installed electronic device to fold or articulate just as it does when not installed in protective case 100.

Figure 1B:
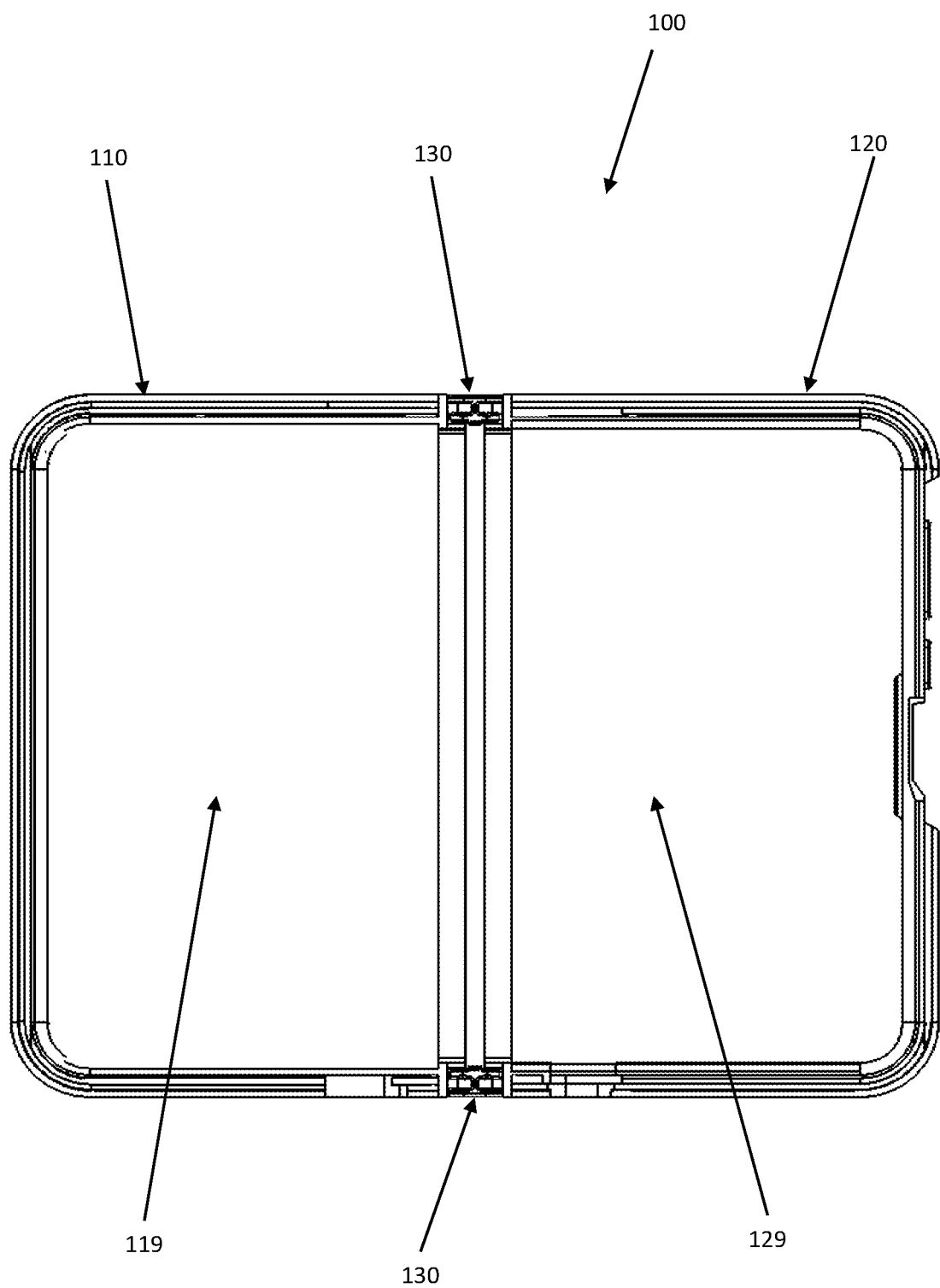
FIG. 1B illustrates the protective case of FIG. 1A with protective membranes installed.

FIG. 1B illustrates protective case 100 with first membrane 119 and second membrane 129 installed. First membrane 119 and/or second membrane 129 may be transparent, or substantially transparent, through which display(s) of the electronic device may be visible and/or operable in a touch sensitive manner through the membrane. First membrane 119 and/or second membrane 129 may be formed from a flexible plastic film or from another material such as glass, or a fortified glass. Although first membrane 119 and second membrane 129 are referred to as 'membranes' each may be flexible, rigid, or semi-rigid. First membrane 119 and/or second membrane 129 may also be referred to as a screen protector or protective film.

First membrane 119 and/or second membrane 129 may be permanently, semi-permanently, or removably attached to first member 110 and second member 120, respectively. First membrane 119 and/or second membrane 129 may slide into slots on first member 110 and second member 120, respectively. In other examples, first membrane 119 and/or second membrane 129 may be attached or adhered to the electronic device and not to first member 110 or second member 120. While two membranes are illustrated, the apparatuses disclosed herein may include more or fewer membranes or screen protectors. In one example, there may be two additional membranes which extend over the opposite sides of the first and second portions of the electronic device. In other words, membranes or screen protectors may extend over both side of each of the first portion and the second portion of the electronic device.

Figure 2:
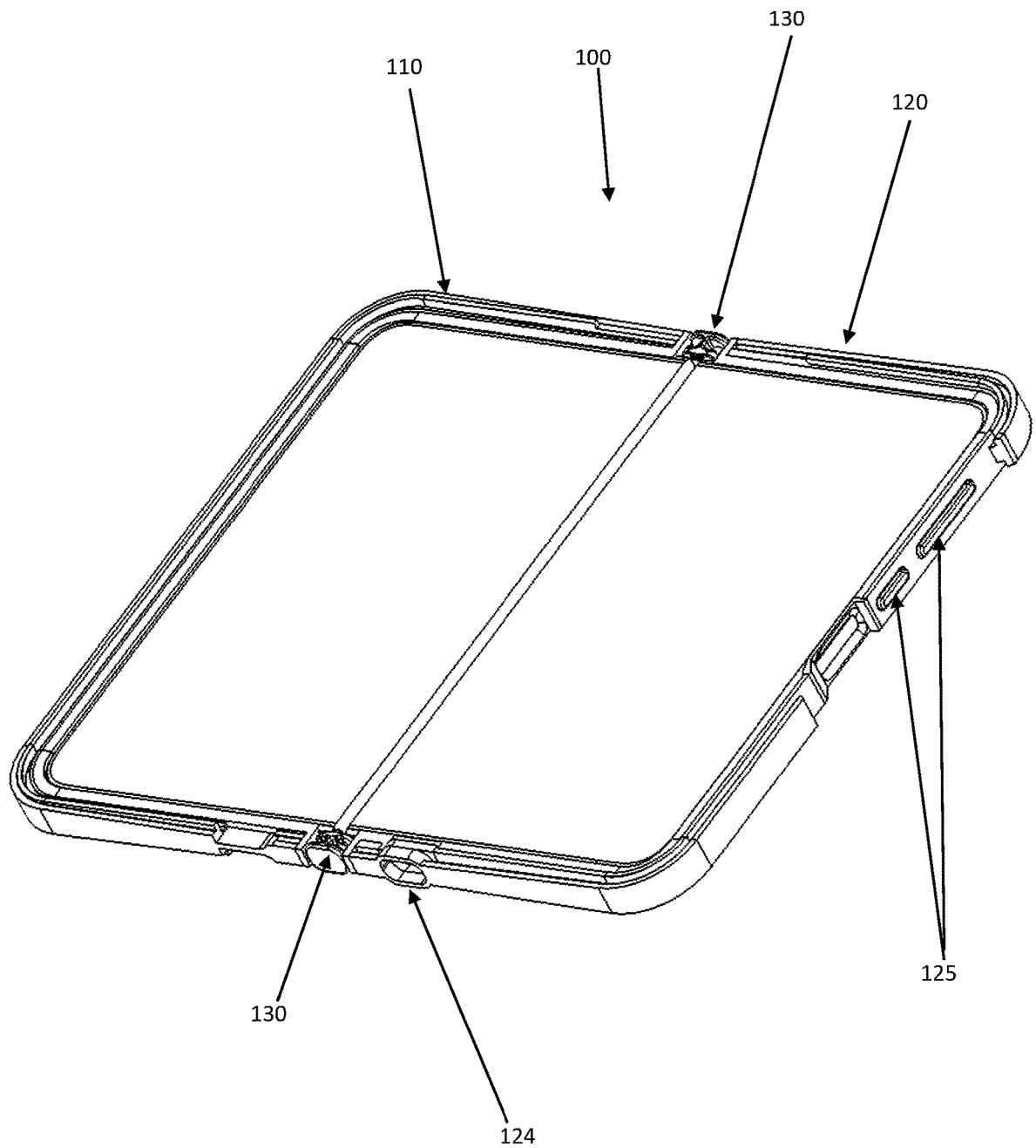
FIG. 2 illustrates a perspective view of the protective case of FIG. 1A.

FIG. 2 illustrates a perspective view of protective case 100 of FIGS. 1A and 1B. FIG. 2 also illustrates that any portion of protective case 100 may have ports or openings, such as port opening 124, for providing access to a connector, switch, or feature of the electronic device. Any portion of protective case 100 may also have other features, such as button actuators 125, for operating or actuating a feature of electronic device 100 from an outside surface of protective case 100. Protective case 100 may also include other features which align with features of electronic device 100 such as a camera opening, a speaker port, a microphone opening, and/or features associated with other sensors or input devices of the electronic device.

Figure 3:
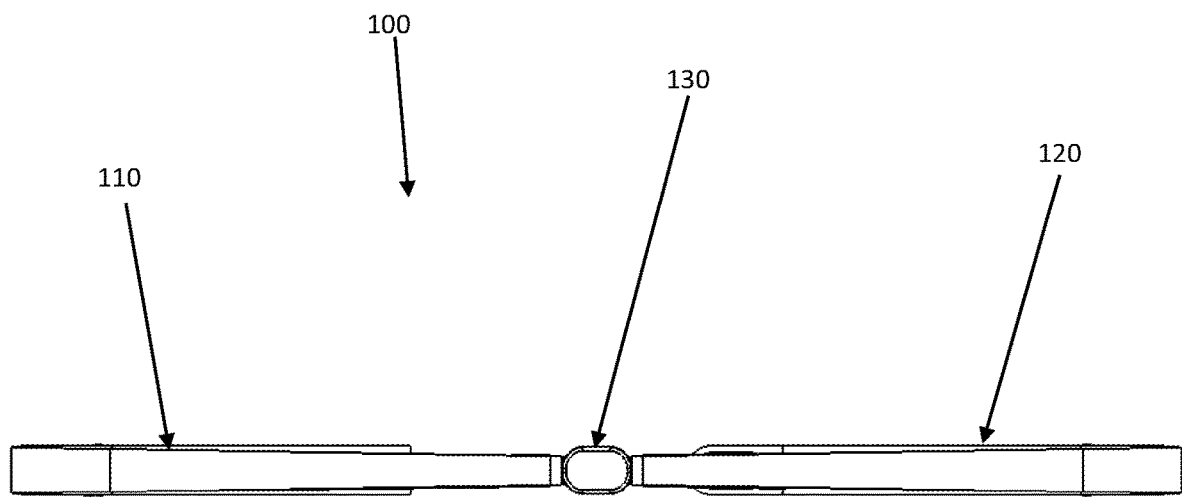
FIG. 3 illustrates a top view of the protective case of FIG. 1A.

FIG. 3 illustrates a top view of protective case 100 in the opened position.

Figure 4:
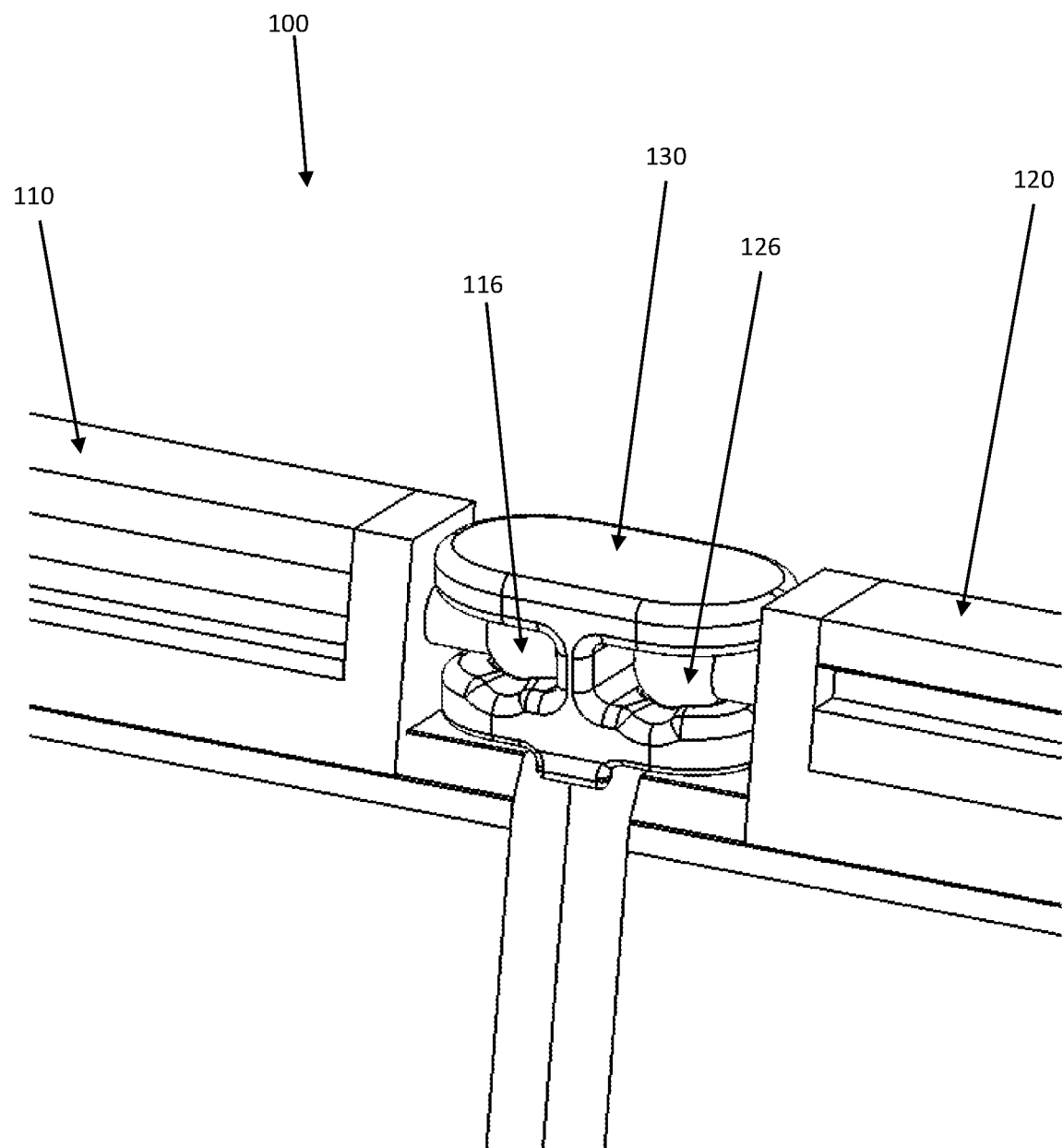
FIG. 4 illustrates a closeup view of a portion of the protective case of FIG. 1A.

FIG. 4 illustrates a closeup view of a portion of protective case 100. Specifically, FIG. 4 illustrates that first member 110 is attached to hinge member 130, either permanently, semi-permanently, or removably, with a first ball 116 that rotates or pivots within hinge member 130 in a captured manner. First ball 116 may have an interference fit with hinge member 130 or may snap into hinge member 130. Alternatively, hinge member 130 may have multiple parts that are assembled around first ball 116 to capture first ball 116. Similarly, FIG. 4 also illustrates that second member 120 is attached to hinge member 130, either permanently, semi-permanently, or removably, with a second ball 126 that rotates or pivots within hinge member 130 in a captured manner. Second ball 126 may have an interference fit with hinge member 130 or may snap into hinge member 130. Alternatively, hinge member 130 may have multiple parts that are assembled around second ball 126 to capture second ball 126. In some examples, other structures may be used which allow pivoting or rotation in multiple dimensions.

Each of first ball 116 and second ball 126 may rotate or pivot individually giving the assembly compound hinge functionality for accommodating the thickness of the electronic device without restricting its articulation. Further, the illustrated assembly may allow each of first member 110 and second member 120 to independently pivot, rotate, or articulate in either direction from the positions illustrated in FIG. 4. In other words, each of first member 110 and second member 120 may rotate from the opened position of FIGS. 1A-4 to a first closed position (rotating outward from the page) or rotate to a second closed position (rotating inward toward the page).

While many of the examples herein are discussed with respect to using balls and sockets for attachment, other techniques are possible. In other words, other mechanical attachment methods may be used which permit movable or pivotable connection of any of the components disclosed herein. In some examples, the attachment mechanism(s) may permit movement in multiple axes and/or may create a temporary or removable connections between the components.

Figure 5:
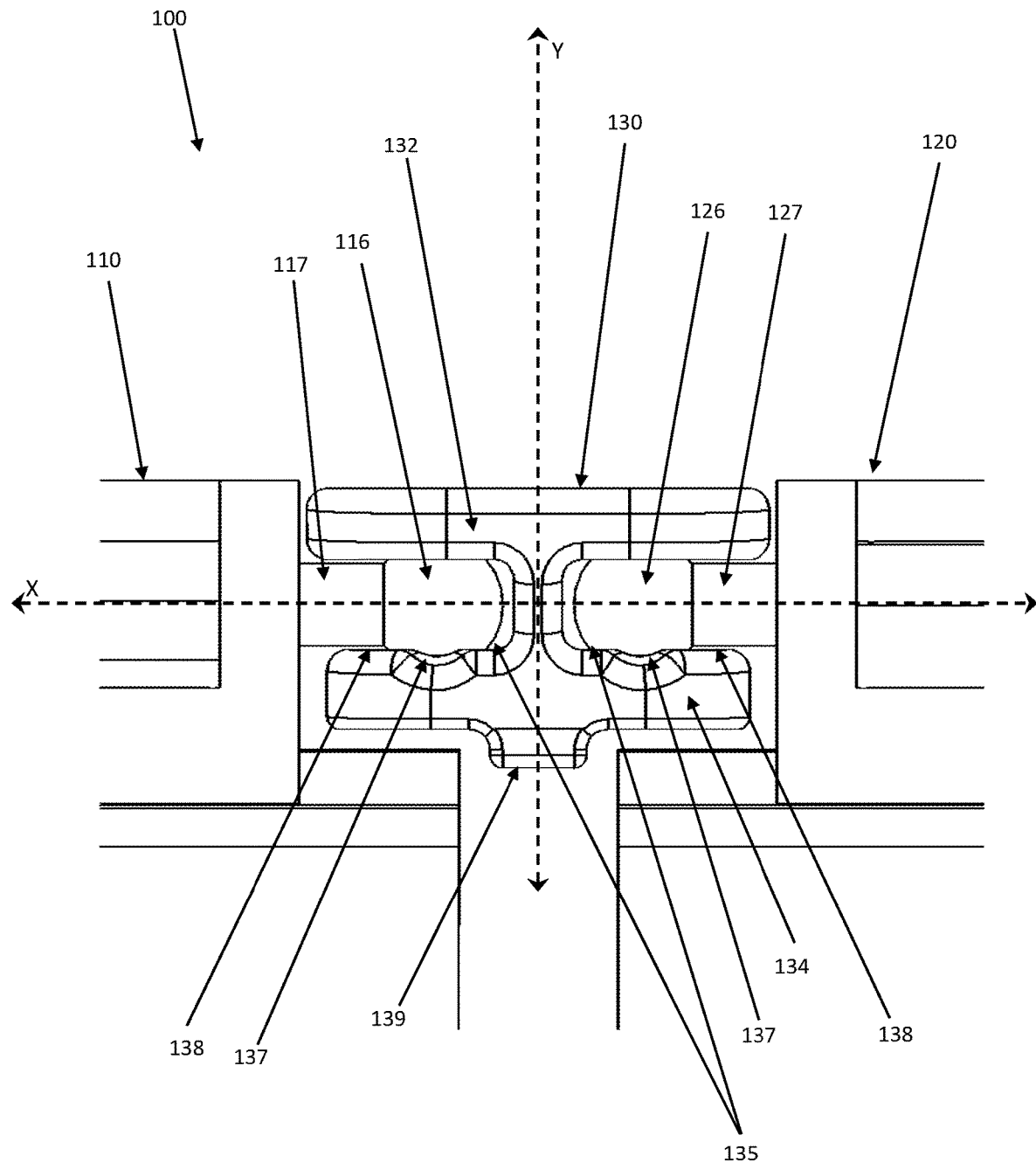
FIG. 5 illustrates a close up view of the hinge member of the protective case of FIG. 1A.

FIG. 5 illustrates a close-up view of hinge member 130 of protective case 100. Hinge member 130 has a top portion 132 and a bottom portion 134. FIG. 5 also illustrates that first ball 116 and second ball 126 may be attached to first member 110 and second member 120, respectively, with first shaft 117 and second shaft 127, respectively. First shaft 117 and second shaft 127 each extend into hinge member 130 through one of slots 138 which are on opposite sides of hinge member 130. Each of first shaft 117 and second shaft 127 may rotate up to 180 degrees, or more, within the respective slot 138. This configuration enables first member 110 and second member 120 to independently pivot, rotate, or articulate in either direction from the positions illustrated in FIG. 4. In other words, each of first member 110 and second member 120 may rotate from the opened position of FIGS. 1A-4 to a first closed position (rotating outward from the page) or rotate to a second closed position (rotating inward toward the page).

When protective case 100 is in the opened position illustrated in FIGS. 1A-4, the shafts extend in opposite direction along a shaft axis X, which may also extend through the centers of first ball 116 and second ball 126. First member 110 and second member 120 may be capable of rotating or pivoting 180 degrees, or a slightly lesser amount such as 178 degrees, 176 degrees, 174 degrees, 172 degrees, 170 degrees, 168 degrees, 166 degrees, or a similar amount. During the rotating or pivoting of first member 110 and second member 120 through these ranges, first shaft 117 and second shaft 127 remain in a single plane that passes through shaft axis X. Throughout this rotating or pivoting, hinge axis Y of hinge member 130 remains perpendicular to shaft axis X as well as the plane of rotation that passes through hinge axis X.

FIG. 5 also illustrates slot recesses 137, which may also be referred to as detents, on each of slots 138. Slot recesses 137 or detents are expanded areas of slots 138 which allow first shaft 117 and second shaft 127 to move laterally, relative to hinge member 130 and slots 138, when they are at a certain point in their respective rotations within slots 138 of hinge member 130. This configuration, as well as tab 139, are discussed in further detail with respect to FIGS. 6-8.

Figure 6:
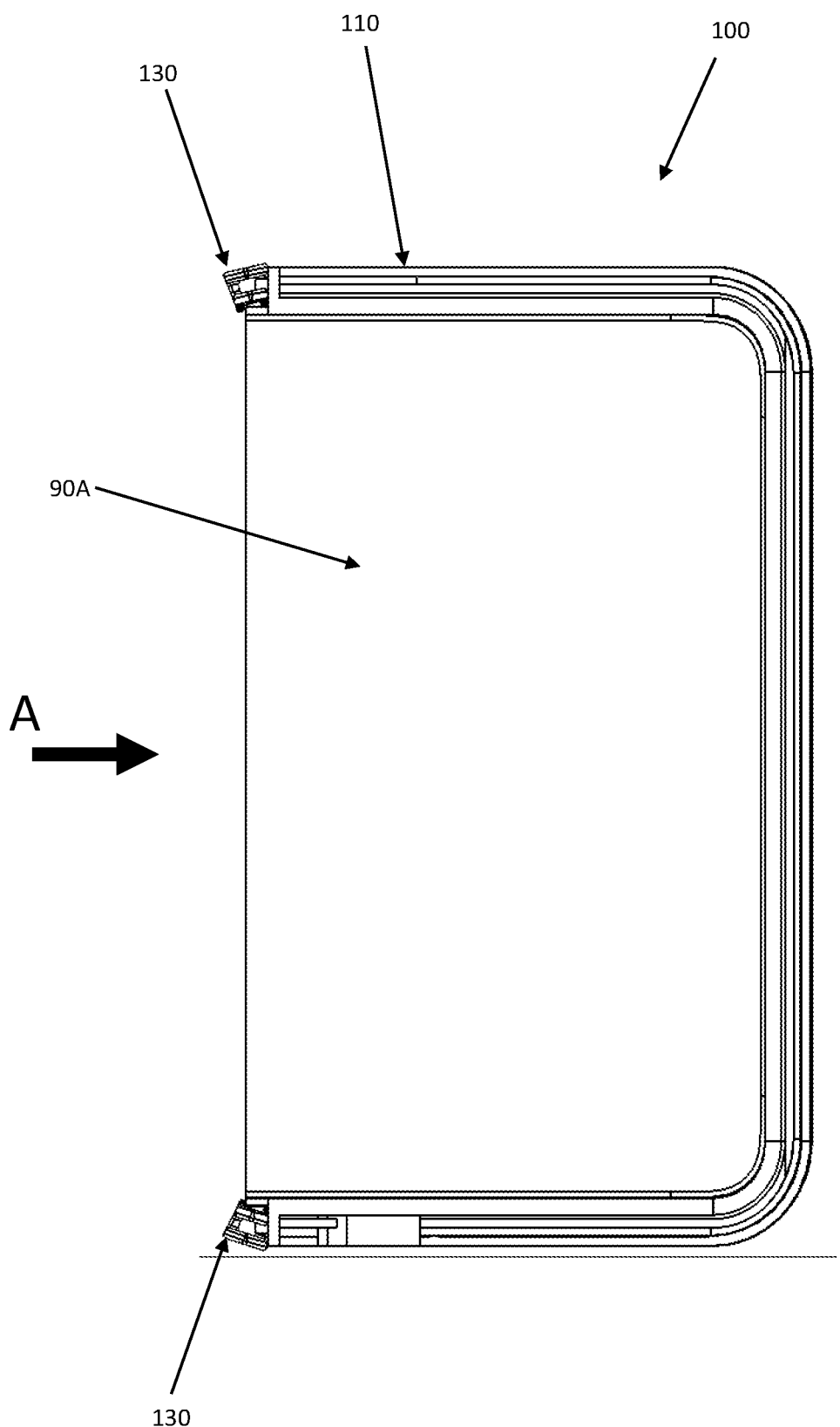
FIG. 6 illustrates the protective case of FIG. 1A in a closed position.
Figure 7:
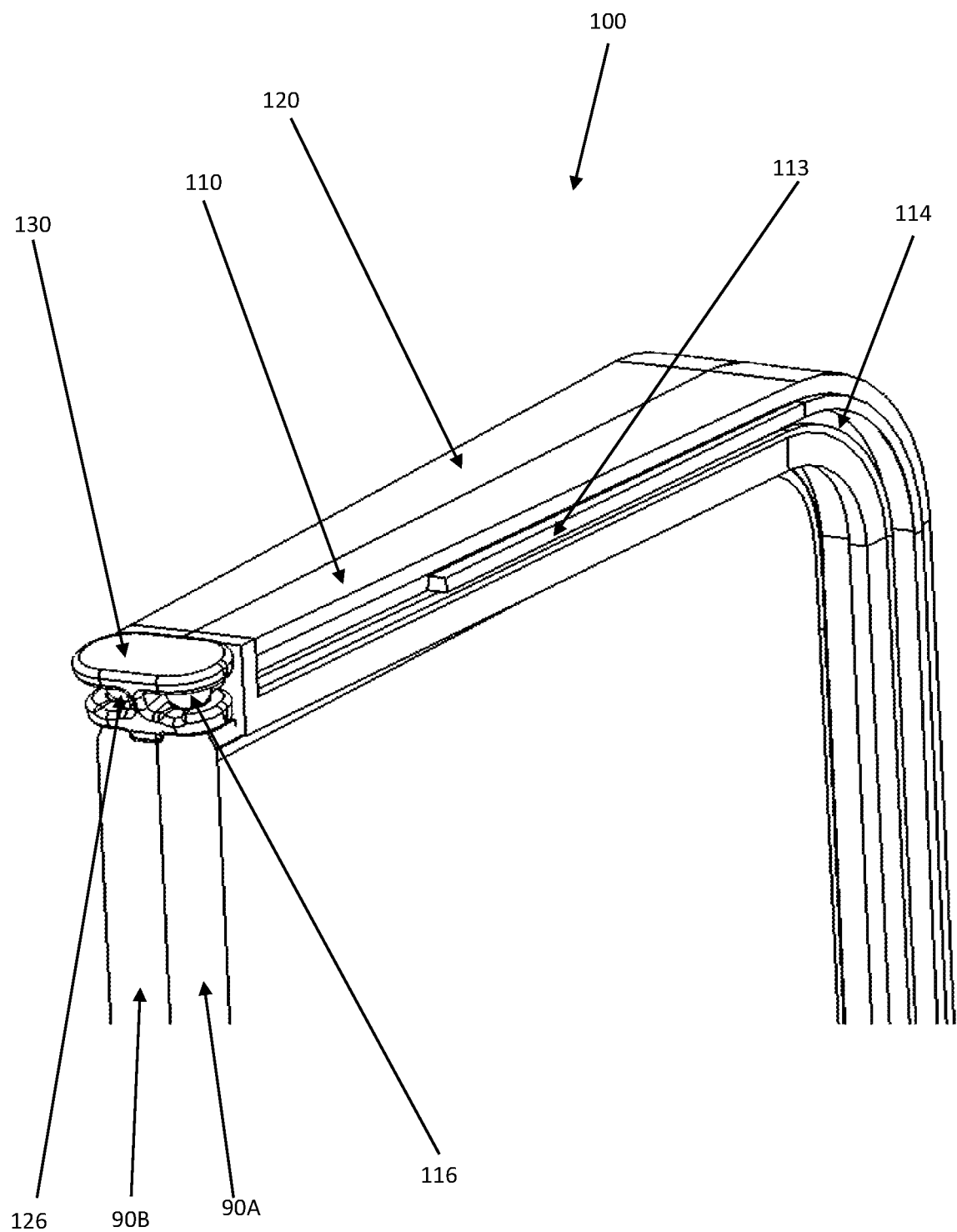
FIG. 7 illustrates a closeup view of a portion of the protective case of FIG. 6.

FIG. 6 illustrates a side view of protective case 100 in the closed position. In FIG. 6, a folded electronic device 90 is installed in protective case 100 in the closed position. Only one portion of electronic device 90, first portion 90A, of electronic device 90 is visible in FIG. 6. FIG. 7 illustrates a portion of the configuration of FIG. 6. In FIG. 7, both portions 90A and 90B of electronic device 90 are visible. The hinge details of electronic device 90 are not illustrated for purposes of simplicity. Electronic device 90 is installed into protective case 100 by sliding it into protective case 100 in the direction of arrow "A" in FIG. 6 while both are in the closed position, substantially in the closed position, or nearly in the closed position. First portion 90A of electronic device 90 slides into first member 110 while second portion 90B simultaneously slides into second member 120.

Figure 8:
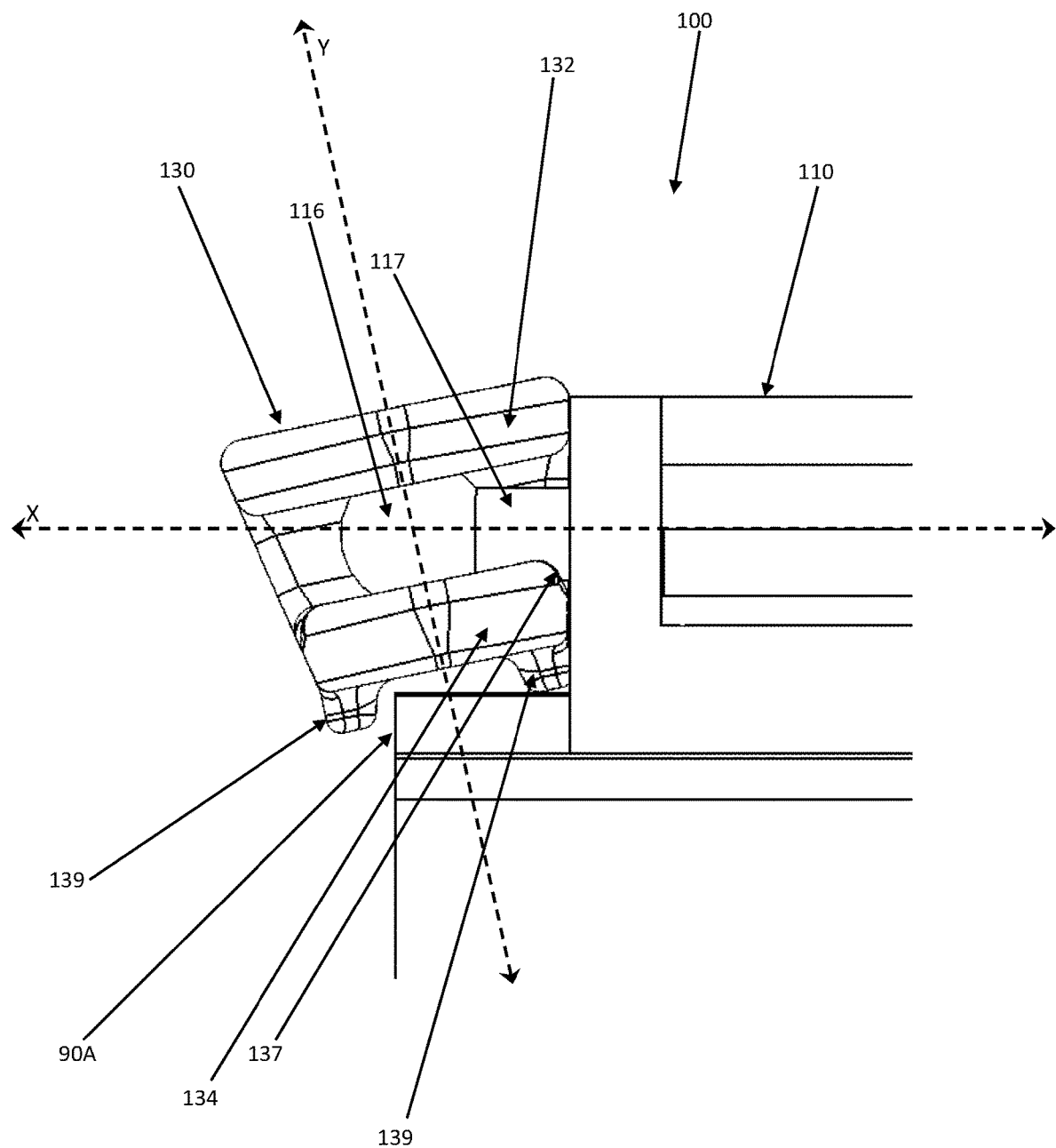
FIG. 8 illustrates a closeup view of the hinge member of the protective case of FIG. 6.

As illustrated in FIGS. 6 and 7, hinge member(s) 130 are rotated downward, inward, or laterally relative to their orientations in FIGS. 1A-5. FIG. 8 illustrates a close-up side view of one hinge member 130 in this orientation when protective case 100 is in the closed position. Top portion 132 of hinge member 130 has a width which is greater than a width of bottom portion 134. When first member 110 and second member 120 (not visible in FIG. 8) are rotated into the closed position, hinge member 130 is forced into the angled position because of interference or contact between first member 110 and/or second member 120 with the wider width of top portion 132 and the limitation of the length of first shaft 117.

When hinge member 130 is forced into the orientation illustrated in FIG. 8, hinge axis Y is no longer perpendicular to shaft axis X and/or the plane of rotation X. This axis shift is permitted to occur because shafts 117 and 127 are adjacent slot recesses 137 (see FIG. 5) when in the closed state. Slot recesses 137 or detents permit shafts 117 and 127 to move laterally when in this position in conjunction with the force applied to top portion 132 of hinge member 130 to achieve the orientation illustrated in FIG. 8.

When hinge member 130 is in the orientation illustrated in FIG. 8, one of tabs 139 is rotated inward or downward and extends farther down than it does in the configurations of FIGS. 4 and 5. Tab 139 is sized and positioned such that when hinge member 130 is in the orientation of FIG. 8, tab member 139 blocks electronic device 90 from inadvertently sliding out of protective case 100 (blocks electronic device 90 from sliding to the left in FIG. 8). The other of tabs 139 may perform the same function when protective case 100 is in the other, inverse, reverse, or alternate closed position. This may be achieved with another set of slot recesses or detents on the opposite side of hinge member 130. Beneficially, electronic device 90 can only be slid into or out of protective case 100 when both the electronic device and the protective case are in a closed position. Due to the features described above, hinge member 130 pivots into the orientation illustrated in FIG. 8 only when protective case 100 is in the closed position, thereby blocking electronic device 90 from inadvertently sliding out of protective case 100. Tab 139 moves out of the way of electronic device 90 when protective case 100 is transitioned from the closed position to the opened position as it returns to the orientation of FIG. 5.

Beneficially, hinge member 130 behaves in the same manner when protective case 100 is transitioned from the opened position to the second closed position as it does when protective case 100 is transitioned from the opened position to first closed position. This feature may be useful when electronic device 90 has displays or features positioned such that it may sometimes be used in the first closed position and at other times in the second closed position, in addition to sometimes being in the opened position.

Hinge member 130 may be formed from a pliable, flexible, or resilient material such that hinge member 130 or tab 139 can be pushed, bent, or forced out of the way when electronic device 90 is being installed in protective case 100 and/or intentionally removed from protective case 100. Such force may have to be applied to one or two instances of hinge member 130. Alternatively, other of the components described herein, including combinations thereof, may be formed from pliable, flexible, or resilient materials to enable installation or intentional removal of electronic device 90 from protective case 100 when a proper force is applied by a user.

Figure 9:
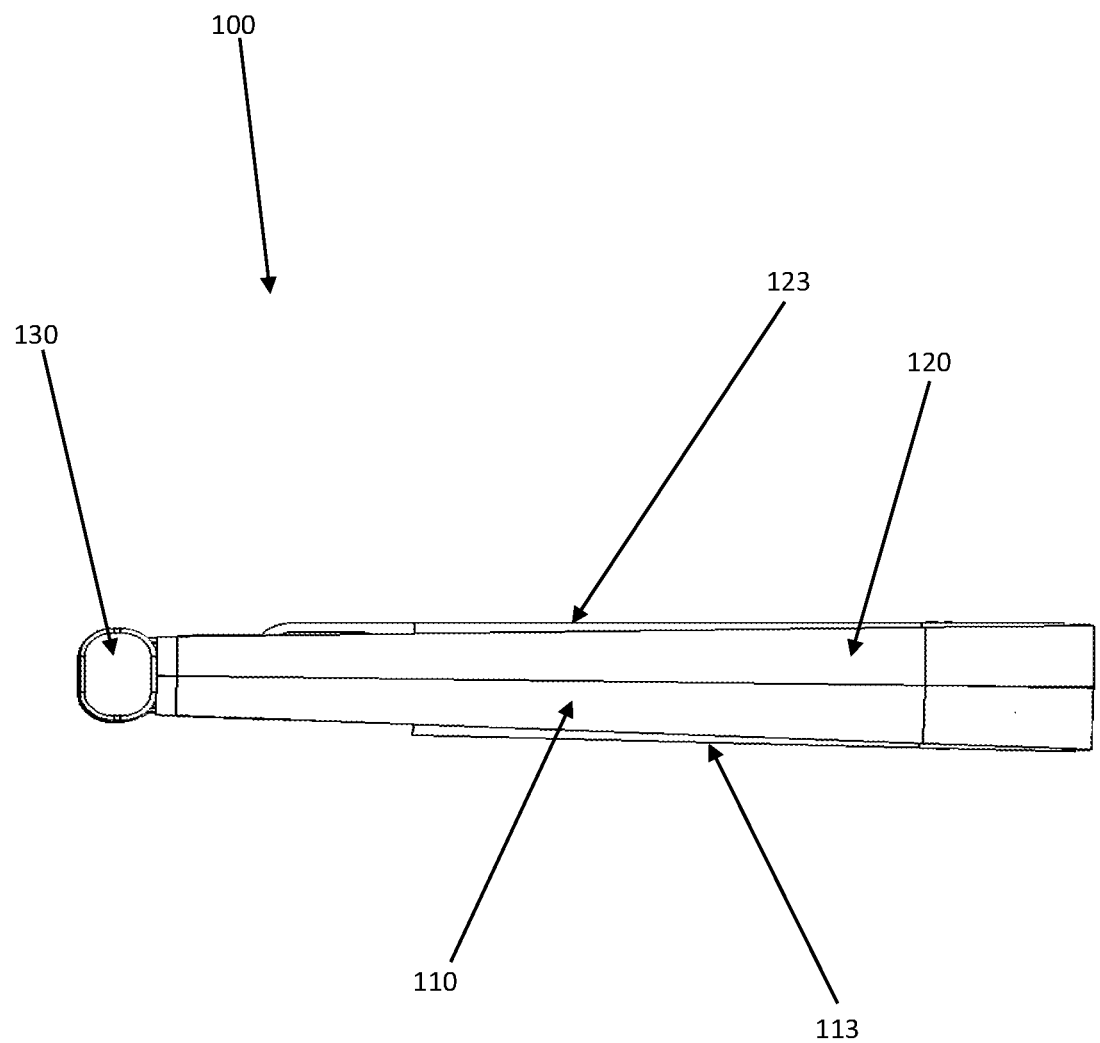
FIG. 9 illustrates a top view of the protective case of FIG. 6.

FIG. 9 illustrates a top view of protective case 100 in the closed position. As illustrated in FIG. 9, each of first member 110 and second member 120 may have one or more raised portions, protrusions, or ridges, such as ridge 113 and ridge 123, the extend or protrude above the primary outer surface of the respective case member (also see FIG. 3). In some examples, the ridge will extend around a portion, or a few portions, of a perimeter of the case member. In some examples, the ridge will extend around a portion of the display for the installed electronic device. Ridges 113 and 123 provide additional protection to the electronic device if it is dropped on a surface because the display of the device will be kept farther from the surface thereby reducing the chances of the display contacting the surface it was dropped onto, particularly if the surface is uneven or has small protrusions, such as on a street. Ridges 113 and 123 may exist on multiple sides to provide this protection in multiple configurations.

While ridges 113 and 123 are beneficial for the reasons described above, protrusions of this type could limit the range of motion of the device when it is in the case and in the alternative closed position. Therefore, first member 110 and second member 120 may also include recesses (not visible in FIG. 9) around the perimeter portions which correspond to or are complimentary with the ridges. This allows the ridges to nest within the recesses of the alternation portion when they are facing inward such that they do limit the rotation of the case to that closed position.

Figure 10:
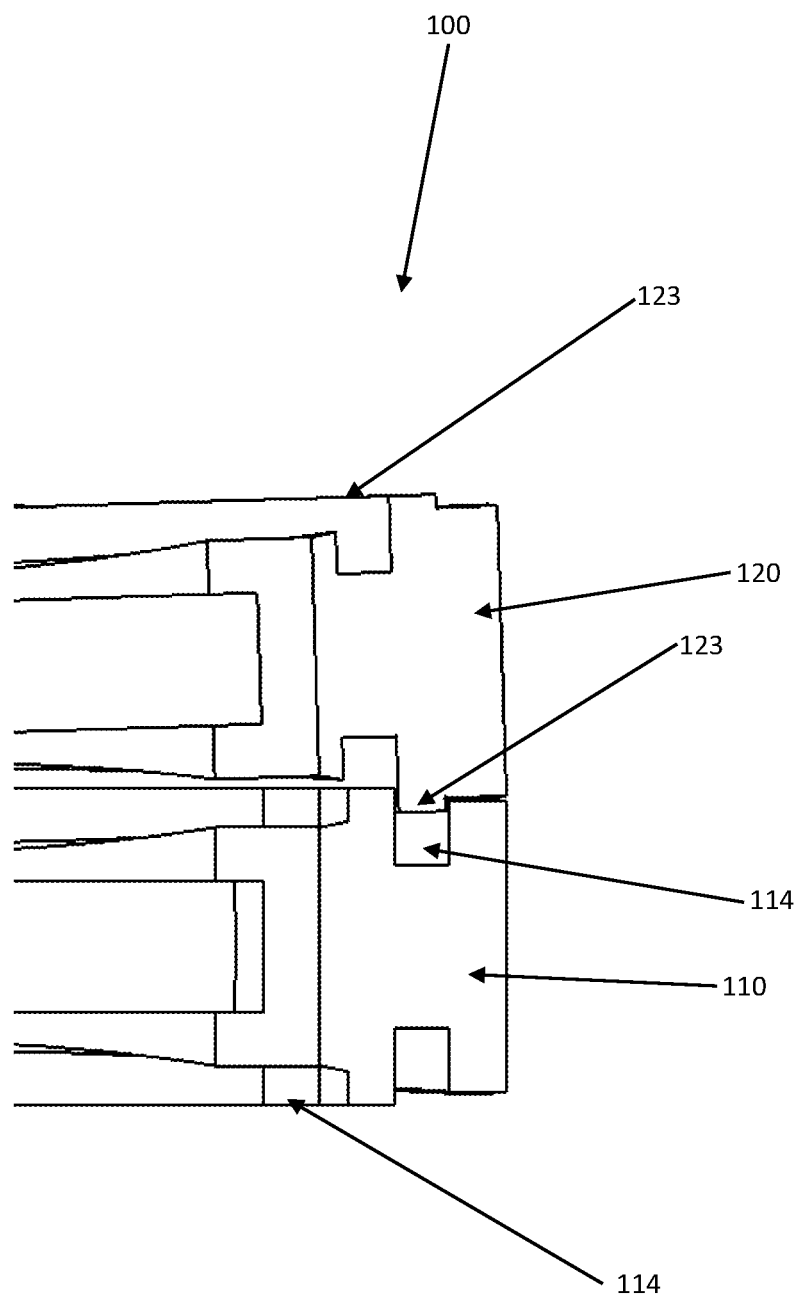
FIG. 10 illustrates a cross sectional view of a portion of the protective case of FIG. 6.

FIG. 10 illustrates a cross sectional view of a portion of the configuration illustrated in FIG. 9. Each of first member 110 and second member 120 may have ridges, such as ridges 123, on one or both primary surfaces. Each of first member 110 and second member 120 may also have recesses, such as recesses 114, on one or both primary sources. Recesses 114 are positioned to receive one or more of ridges 123 from the alternate member when those sides are facing inward and facing each other. This configuration reduces or eliminates the reduction in the range of articulation or motion that would otherwise be caused by the protrusions or ridges. The ridges and recesses may also have a friction or interference fit to maintain the assembly in a currently closed position until a sufficient force is applied to open it.

Figure 11:
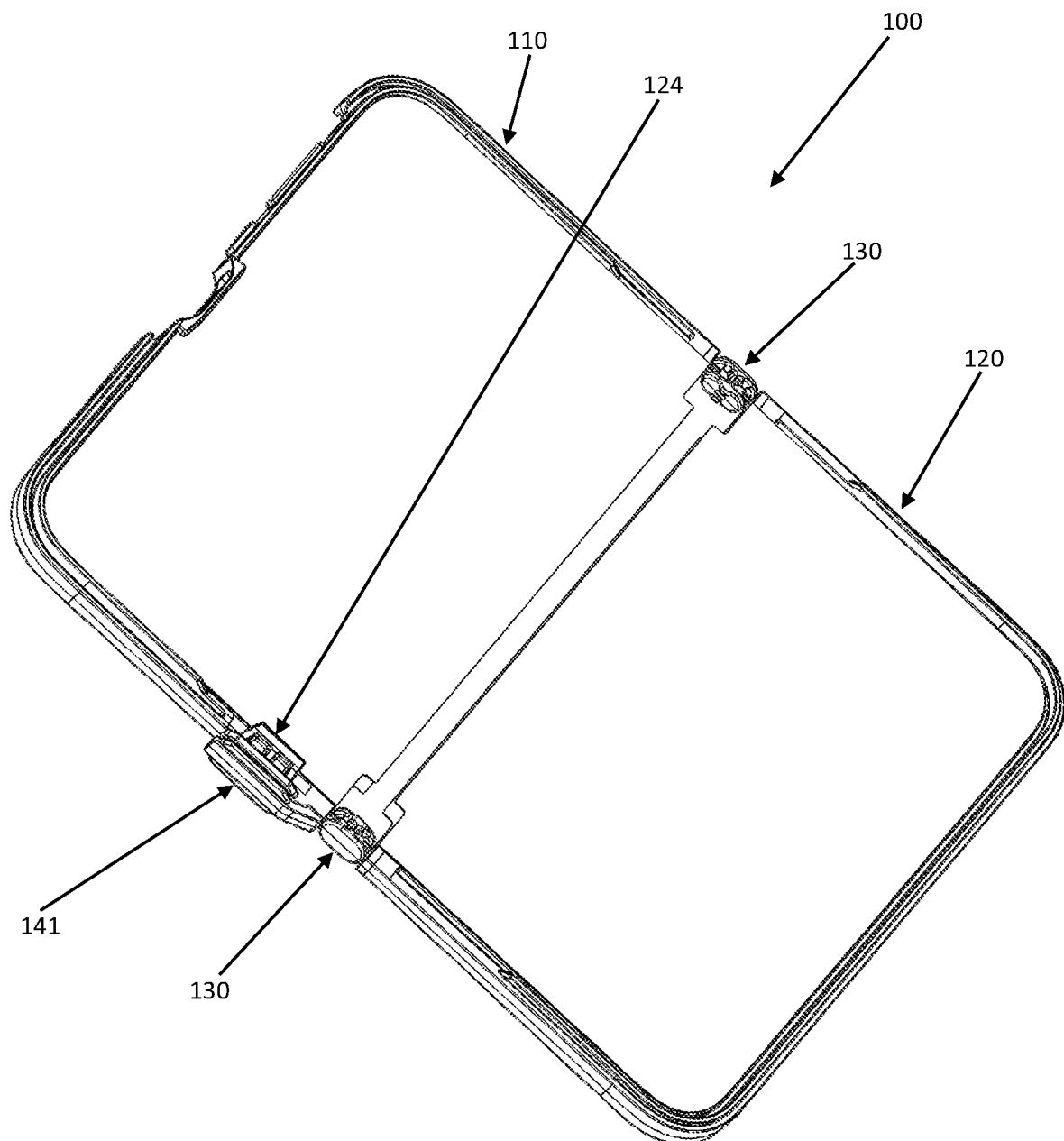
FIG. 11 illustrates another embodiment of a protective case.

FIG. 11 illustrates a variation of protective case 100. In the example of FIG. 11, protective case 100 includes a port door 141 for covering port opening 124 when it is not in use. Port door 141 may prevent dust, grit, and/or liquids from entering port opening 124 when it is not in use. Port door 141 and/or port opening 124 may include a gasket or seal. In addition, port opening 124 may be covered with a membrane, such as a water-resistant membrane. Port door 141 may be tethered or otherwise attached to protective case 100 such that it is not easily misplaced or forgotten when port opening 124 is in use.

Figure 12:
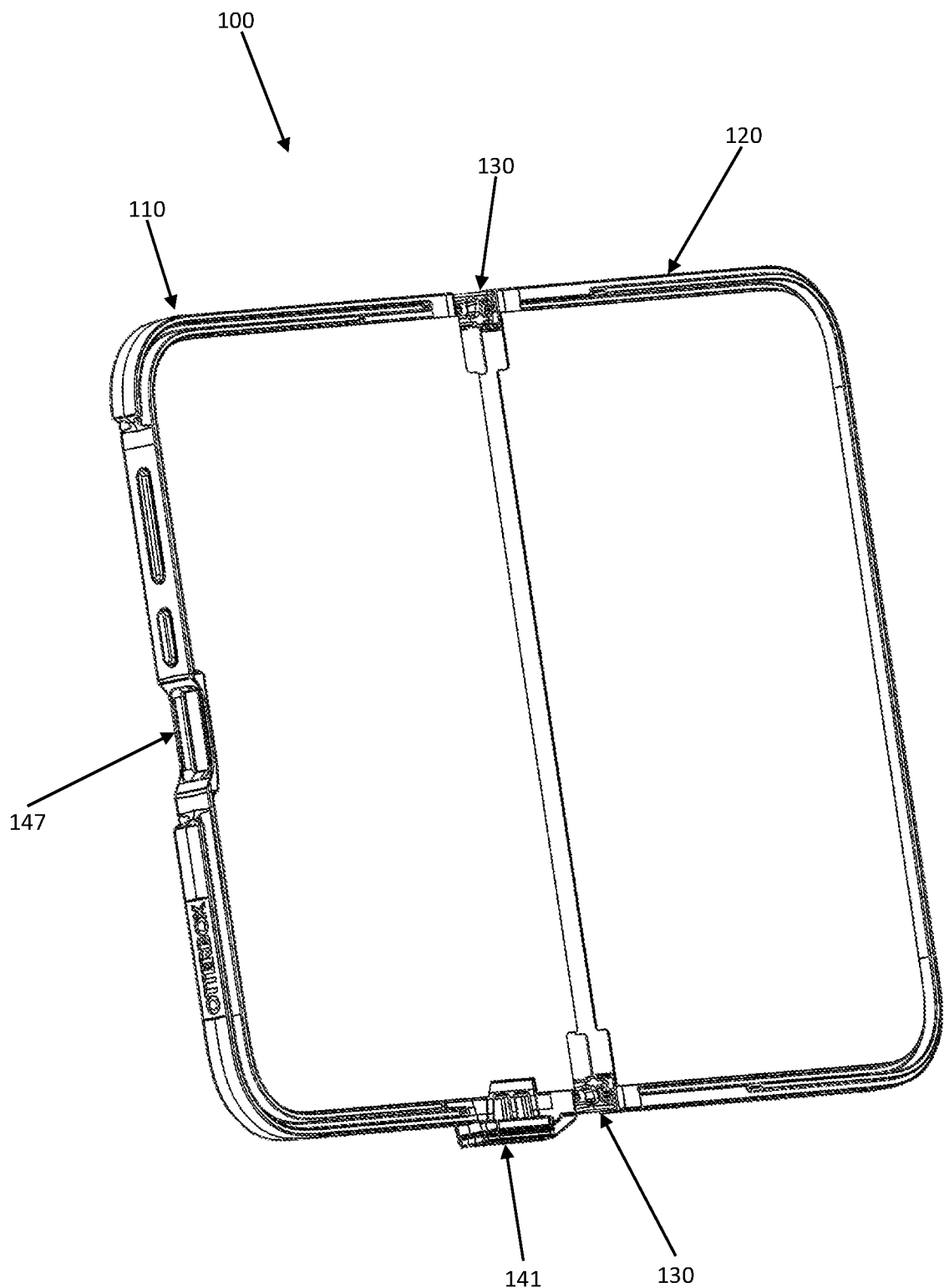
FIG. 12 illustrates another view of the protective case of FIG. 11.

FIG. 12 illustrates an alternate view of the protective case of FIG. 11. In FIG. 12, an interface window 147 is visible on a side of protective case 100. Interface window 147 provides access to a feature of the installed portable electronic device. In one example, interface window 147 provides access to a biometric sensor of the installed electronic device. In a more specific example, interface window 146 provides access to a fingerprint sensor or scanner of the installed electronic device. Interface window 147 may be a port, opening, or aperture. In some examples, interface window 147 may be covered with a thin film or membrane which still permits operation of the feature of the installed electronic device. In other examples, interface window 147 may have a removable cover similar to port door 141.

Any of the apparatuses, techniques, improvements, features, functions, or processes described herein may be implemented in the form of a system or a kit. The system or kit may include any combination of the devices, components, elements, and/or modules disclosed herein.

The elements, components, and steps described herein are meant to exemplify some types of possibilities. In no way should the aforementioned examples limit the scope of the invention, as they are only exemplary embodiments.

The phrases "in some embodiments," "in an exemplary embodiment," "in one exemplary embodiment," "in some exemplary embodiments," "according to some embodiments," "in the embodiments shown," "in other embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations of the disclosed techniques may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention, except as limited by the prior art.

What is claimed is:

1. A protective case for a foldable electronic device having a first portion that is hingeably attached to a second portion, the foldable electronic device configured to articulate between a closed position and an opened position, the protective case comprising:
    a first member configured for slidably receiving the first portion of the foldable electronic device, the first member having a first ball extending from the first member;
    a second member configured for slidably receiving the second portion of the foldable electronic device, the second member having a second ball extending from the second member; and
    a hinge member having a first socket for receiving the first ball of the first member and a second socket for receiving the second ball of the second member, wherein each of the first and second balls is configured to rotate within a respective one of the first and second sockets in multiple axes, wherein the first member articulates relative to the second member such that the foldable electronic device electronic remains articulable between the closed position and the opened position when the protective case is installed on the foldable electronic device, and wherein the hinge member is configured to pivot inward when the protective case is transitioned from the opened position to the closed position to prevent the foldable electronic device from sliding out of the protective case.

2. The protective case of claim 1 wherein the hinge member includes a first slot which provides access to the first socket and a second slot which provides access to the second socket, wherein the first slot and the second slot are on opposing sides of the hinge member.

3. The protective case of claim 2 wherein the first ball is attached to the first member with a first shaft and the second ball is attached to the second member with a second shaft.

4. The protective case of claim 3 wherein the first and the second balls permit the first and second shafts, respectively, to rotate within the respective slots of the hinge member within a first plane when transitioning between the opened position and the closed position.

5. The protective case of claim 4 wherein each of the slots includes a recess configured to receive the respective shaft when the protective case is in the closed position, wherein the hinge member pivots inward when the shafts are received in the respective slot recesses, wherein the hinge member pivots inward in a second plane that is different from the first plane.

6. The protective case of claim 5 wherein the hinge member includes a top portion and a bottom portion, wherein the top portion has a width that is greater than a width of the bottom portion.

7. The protective case of claim 6 wherein at least one of the first member and the second member contact the top portion of the hinge member when the protective case is transitioned to the closed position causing the hinge member to pivot inward due to the width of the top portion being greater than the width of the bottom portion and due to the shafts being received in the slot recesses.

8. The protective case of claim 1 wherein the first portion and the second portion of the foldable electronic device slide into the first member and the second member of the protective case, respectively, when the foldable electronic device is substantially in the closed position to install the foldable electronic device in the protective case.

9. The protective case of claim 1 further comprising a second hinge member, wherein the first member includes a third ball and a third shaft and the second member includes a fourth ball and a fourth shaft.

10. The protective case of claim 9 wherein the third ball, the third shaft, the fourth ball, and the fourth shaft interface with the second hinge member.

11. The protective case of claim 1 further comprising a first substantially transparent membrane which interfaces with the first member and is configured to extend over a display area of the first portion of the foldable electronic device and a second substantially transparent membrane which interfaces with the second member and is configured to extend over a display area of the second portion of the foldable electronic device.

12. A protective case for a foldable electronic device having a first portion that is hingeably attached to a second portion, the foldable electronic device configured to articulate between a first closed position, a second closed position, and an opened position, the protective case comprising:
    a first member configured for slidably receiving the first portion of the foldable electronic device when in the first closed position or the second closed position;
    a second member configured for slidably receiving the second portion of the foldable electronic device when in the first closed position or the second closed position; and
    two hinge members each rotatably attached to the first member and to the second member such that each hinge member is rotatable relative to each of the first and second members in multiple axes, wherein the hinge members permit the first member to articulate relative to the second member such that the foldable electronic device electronic remains articulable between the closed positions and the opened position when the protective case is installed on the foldable electronic device, wherein the hinge members are configured to pivot inward toward each other when the protective case is transitioned from the opened position to the closed positions to prevent the foldable electronic device from inadvertently sliding out of the protective case in the closed positions.

13. The protective case of claim 12 wherein the two hinge members are positioned at opposing ends of the first member and the second member.

14. The protective case of claim 12 wherein each of the first member and the second member include a first ball and a second ball each positioned at the end of a respective shaft, and wherein each of the hinge members includes two sockets each configured for receiving one of the balls and permitting the balls to rotate in the sockets in the multiple axes.

15. The protective case of claim 14 wherein each of the hinge members includes detents associated with each of the sockets, wherein the shafts rest in the detents when the protective case is in one or more of the closed positions enabling the hinge members to pivot inward.

16. A protective cover for a foldable electronic device, the foldable electronic device having a first portion that is hingeably attached to a second portion and adapted to articulate between a closed position and an opened position, the protective cover comprising:
   a first member adapted for slidably receiving the first portion of the foldable electronic device, the first member having a shaft extending from an edge of the first member;
   a second member adapted for slidably receiving the second portion of the foldable electronic device, the second member having a shaft extending from an edge of the second member; and
   a hinge member adapted for attaching the first member to the second member, wherein the hinge member has attachment mechanisms for receiving the shafts of the first and second members, wherein the shafts pivot with respect to the hinge member in a plane when the first member articulates relative to the second member, wherein the hinge member is adapted to rotate toward a center of the protective cover about an axis that is in the plane when the protective cover is transitioned from the opened position to the closed position to block the foldable electronic device from sliding out of the protective cover, and wherein each of the hinge members includes a detent adapted to receive the respective shaft when the protective cover is in the closed position, wherein the hinge member pivots toward the center of the protective cover when the shafts are received in the respective detents.

17. The protective cover of claim 16 wherein each hinge member includes slots through which the shafts rotate when the protective cover is transitioned from the opened position to the closed position.

18. The protective cover of claim 16 further comprising a second hinge member.

* * * * *